United States Patent [19]
Takei et al.

[11] Patent Number: 5,807,004
[45] Date of Patent: Sep. 15, 1998

[54] ROLLER FOR IMAGE FORMING APPARATUS

[75] Inventors: Masafumi Takei; Kenji Sakurai, both of Nagano, Japan

[73] Assignee: Seiko Epson Corporation, Tokyo, Japan

[21] Appl. No.: 625,511

[22] Filed: Mar. 29, 1996

[30] Foreign Application Priority Data

Mar. 31, 1995 [JP] Japan ................................ 7-099731
Feb. 8, 1996 [JP] Japan ................................ 8-046606

[51] Int. Cl.⁶ .............................................. B41J 11/053
[52] U.S. Cl. ................................ 400/661.1; 400/659
[58] Field of Search ................................ 400/657, 658, 400/659, 661, 661.1, 661.2, 661.3, 661.4, 662; 101/375, 376; 492/18, 49, 50, 45, 56

[56] References Cited

U.S. PATENT DOCUMENTS

| | | | |
|---|---|---|---|
| 110,098 | 12/1870 | Whitney | 492/45 |
| 503,019 | 8/1893 | Walscheid | 492/45 |
| 596,099 | 12/1897 | Wood | 400/661 |
| 826,288 | 7/1906 | Tilgner | 492/45 |
| 964,000 | 7/1910 | Deelen | 492/45 |
| 1,166,390 | 12/1915 | Sholes | 400/661 |
| 1,415,844 | 5/1922 | Mulock | 400/661 |
| 1,496,692 | 5/1924 | Voss | 492/45 |
| 2,088,471 | 7/1937 | Freedlander | 492/56 |
| 3,883,293 | 5/1975 | McCarroll | 492/56 |
| 4,186,162 | 1/1980 | Daley | 101/375 |
| 4,583,272 | 4/1986 | Keller | 400/659 |
| 4,627,755 | 12/1986 | Moriyama et al. | 400/662 |
| 5,099,560 | 3/1992 | Kato et al. | 29/130 |
| 5,507,382 | 4/1996 | Hartwell et al. | 198/837 |

FOREIGN PATENT DOCUMENTS

| | | |
|---|---|---|
| 0 062 140 | 2/1982 | European Pat. Off. . |
| 0 280 241 | 2/1988 | European Pat. Off. . |
| 3306222 A1 | 8/1984 | Germany ................ 400/661 |
| 3736730 A1 | 5/1988 | Germany ................ 400/662 |
| 62-108075(A) | 5/1987 | Japan ................ 400/659 |
| 2-241766(A) | 9/1990 | Japan ................ 400/662 |
| 63-256470 | 3/1995 | Japan . |
| 875645 | 8/1961 | United Kingdom ........... 101/375 |

OTHER PUBLICATIONS

Abstracts of Japan vol. 11 No. 34 (M–558), Jan. 1987 and JP–A–61 202 865.
Patent Abstracts of Japan vol. 12 No. 227 (M–713) 28 Jun. 1988 and JP–A–63 025013.

*Primary Examiner*—Edgar S. Burr
*Assistant Examiner*—Amanda B. Sandusky
*Attorney, Agent, or Firm*—Stroock & Stroock & Lavan LLP

[57] ABSTRACT

A roller for an image forming apparatus comprises: a core body having a shaft positioned in the center thereof, the core body being formed by solidifying a fluid around an outer circumference of the shaft; and a surface layer formed on a surface of said core body, the surface layer being made of hard rubber and having a uniform thickness over the surface of the core body. A mold for the roller, comprises: an inner surface whose section is the same as a section of the core body; a pair of half-split bodies, one end wall of each half-split body having a recess for clamping the shaft, other end wall of each half-split body having a injecting hole for injecting a core body forming fluid therefrom; and a stopper body serving as an aligning member having a through hole in the middle thereof for inserting the shaft thereinto, the stopper body further projecting a stopper on an outer circumference thereof for fitting the stopper into the injecting hole.

9 Claims, 4 Drawing Sheets

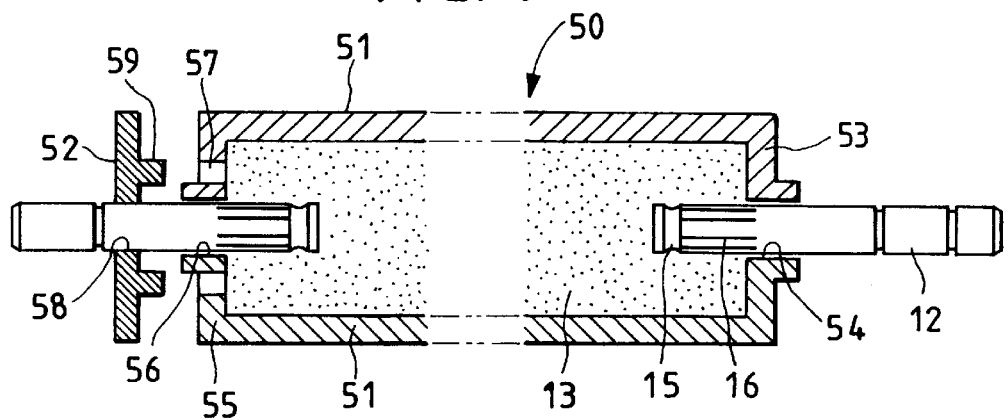
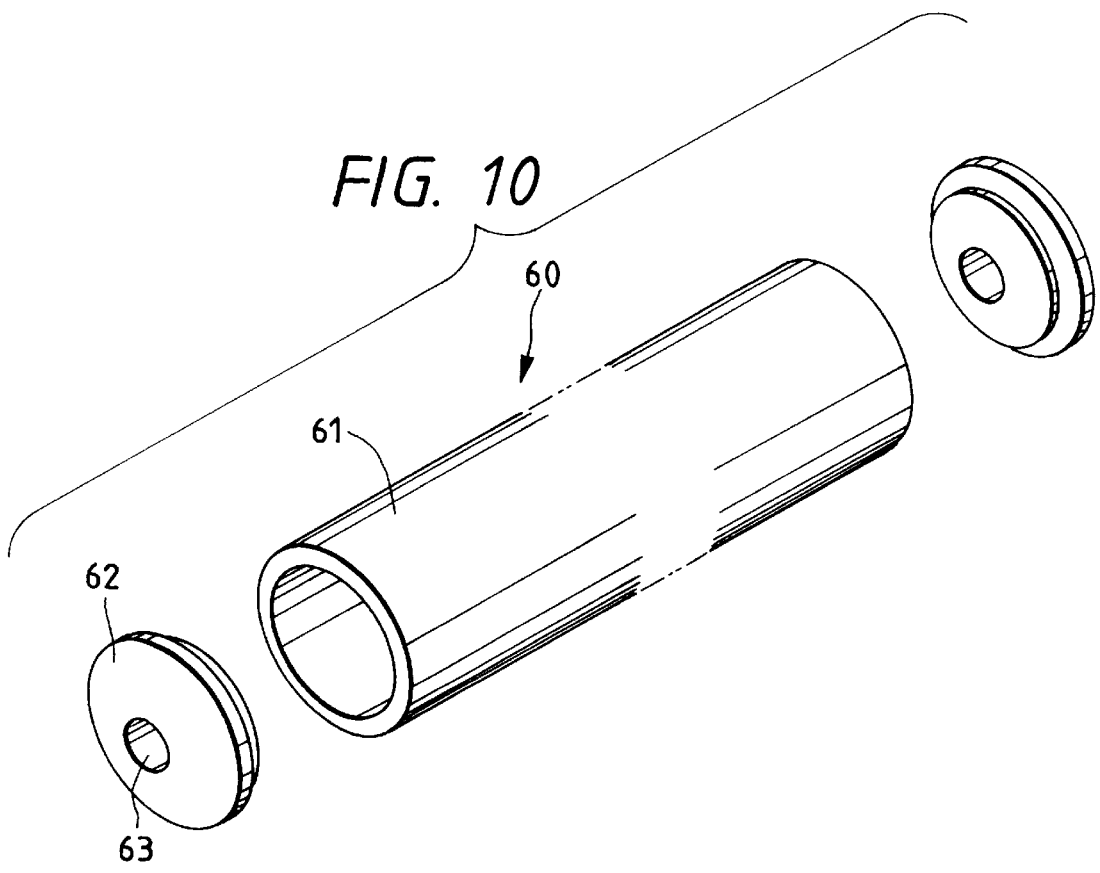

ROLLER FOR IMAGE FORMING APPARATUS

BACKGROUND OF THE INVENTION

The invention relates to a roller for an image forming apparatus such as a platen roller, and to a mold for forming such a roller.

For example, a wire dot printer forms desired characters and graphics on a recording sheet by impinging the tips of wires onto the recording sheet through an ink ribbon. As a result of this operation, there exists the problem that impinging noise is made during data writing.

In order to overcome this problem, the present applicant has proposed a platen roller in Unexamined Japanese Patent Publication No. Sho. 63-256470. Unlike a platen roller that has heretofore been constructed of a hollow metal pipe, the proposed platen roller is characterized by charging air-bubble-containing concrete into such hollow pipe. As a result of this construction, the propagation of noise is controlled to implement low noise design. On the other hand, this platen roller imposes difficulties in molding the roller shaft with correct shaft center ensured, as well as the problem of noise absorption, durability, and the like.

SUMMARY OF THE INVENTION

The invention has been made in view of the aforementioned difficulties and problems. The object of the invention is, therefore, to provide not only a novel roller for an image forming apparatus which can be molded with ease and which exhibits excellent noise absorption and durability when applied to wire dot printers, but also a mold for forming such a roller.

To achieve the above object, the invention is applied to a roller for an image forming apparatus, which includes: a core body that is formed by solidifying a fluid around an outer circumference of a shaft with the shaft positioned in the center; and a surface layer that is formed on a surface of the core body. The surface layer is made of hard rubber and has a uniform thickness over the surface of the core body. Further, invention is also applied to a roller forming mold for forming a core body by solidifying a fluid around a shaft. The mold has an inner surface whose section is the same as a section of the core body. The mold includes a pair of half-split bodies and a stopper body serving also as an aligning member. One end wall of each half-split body has a recess for clamping the shaft. The other end wall of each half-split body has a hole for charging a core body forming fluid. The stopper body serving also as an aligning member has a through hole in the middle thereof so that the shaft can be inserted into the through hole. The stopper body serving also as an aligning member projects a stopper on an outer circumference thereof so that the stopper can be fitted into the charging hole.

BRIEF DESCRIPTION OF THE DRAWINGS

FIG. 9 is a sectional view showing another mold for forming a platen roller; and FIG. 10 is a perspective view showing still another mold for forming a platen roller.

DETAILED DESCRIPTION OF THE PREFERRED EMBODIMENTS

Embodiments of the invention will now be described.

Figure 1:
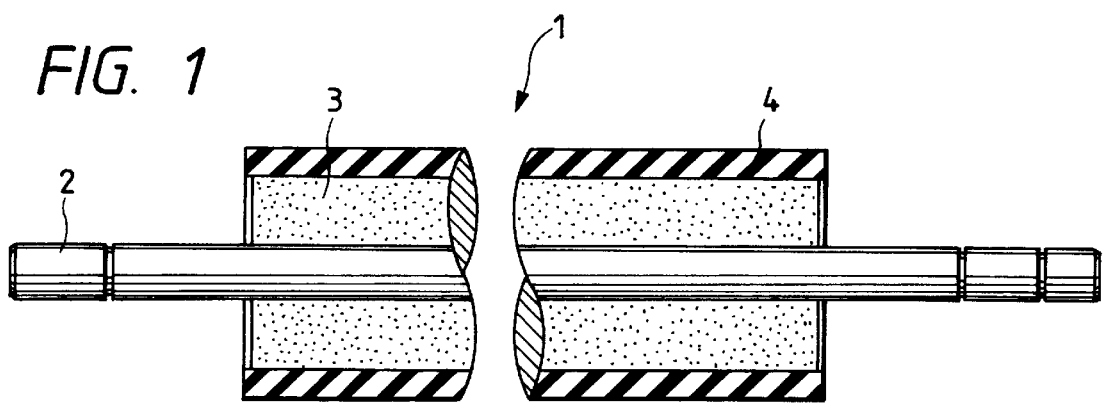
FIG. 1 is a sectional view showing a platen roller according to a first embodiment of the invention.

FIG. 1 shows a platen roller for a wire dot printer, which is an embodiment of the invention. The platen roller 1 is prepared by integrally forming a cylindrical core body 3 around the circumferential surface thereof with a roller shaft 2 positioned in the center and further arranging a surface layer 4 made of rubber around the outer circumferential surface of the thus formed core body 3. The core body 3 is made of a fluid material that can be solidified, such as cement or ceramic sintered at a high temperature, (hereinafter referred to simply as "ceramic"). The surface layer 4 is vulcanized at a high temperature so as to be integrated with the core body. Such process is taken in order to make the thickness of the surface layer 4 uniform, to ensure a predetermined hardness, and to project the surface layer 4 slightly from both end faces of the core body 3 so that part of the core body 3 can be protected from breakage.

Figure 8:
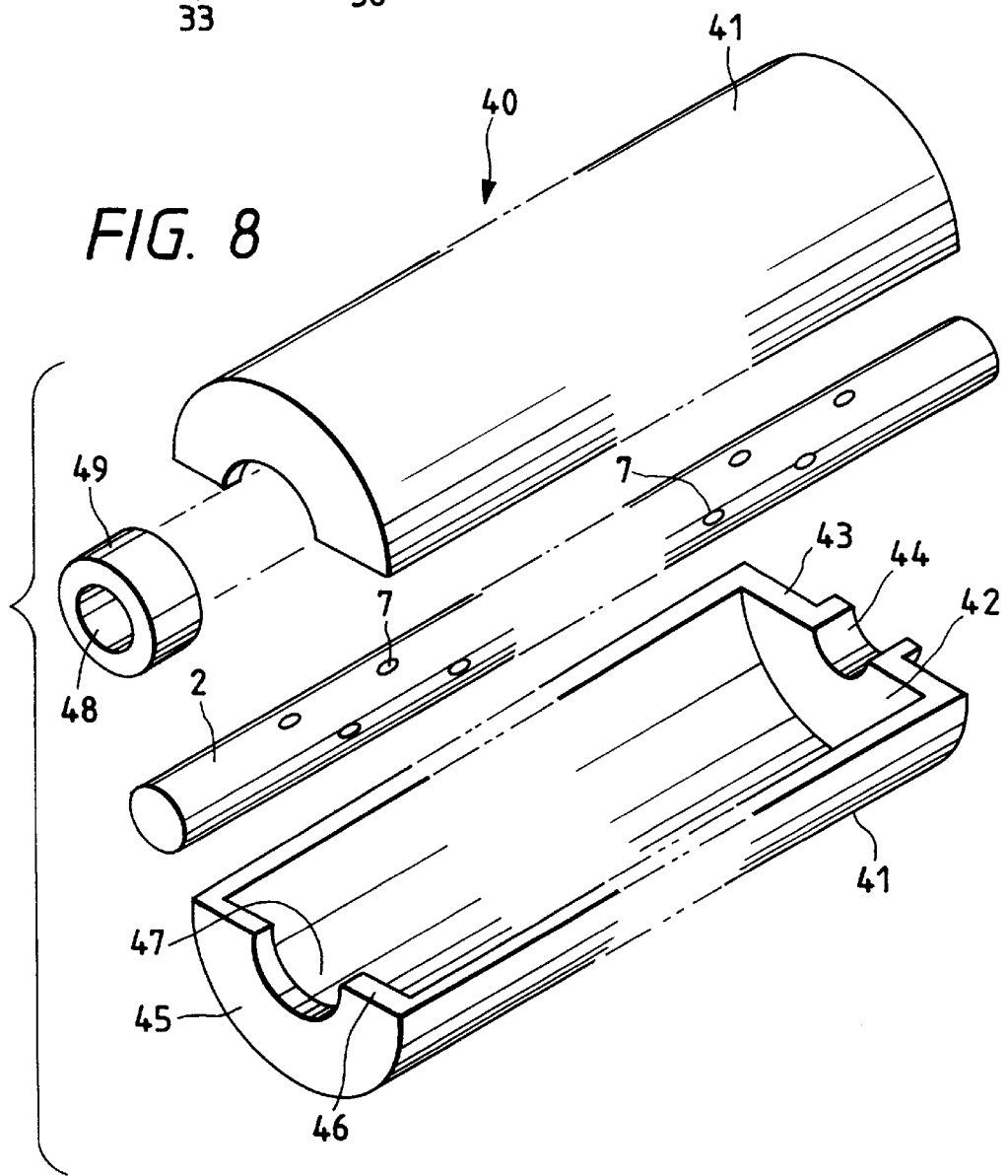
FIG. 8 is a perspective view showing a mold for forming a platen roller.

On the other hand, the roller shaft 2 that is to be arranged in the shaft center of the core body 3 has blind holes 7 formed, by a drill or the like, at a plurality of positions over the circumferential surface thereof as shown in FIG. 8. The blind holes 7 are used for coupling the roller shaft 2 with the ceramic. When the ceramic is charged, part of the ceramic fills in the blind holes 7 to thereby allow the roller shaft 2 to be firmly integrated with the core body 3.

Figure 2:
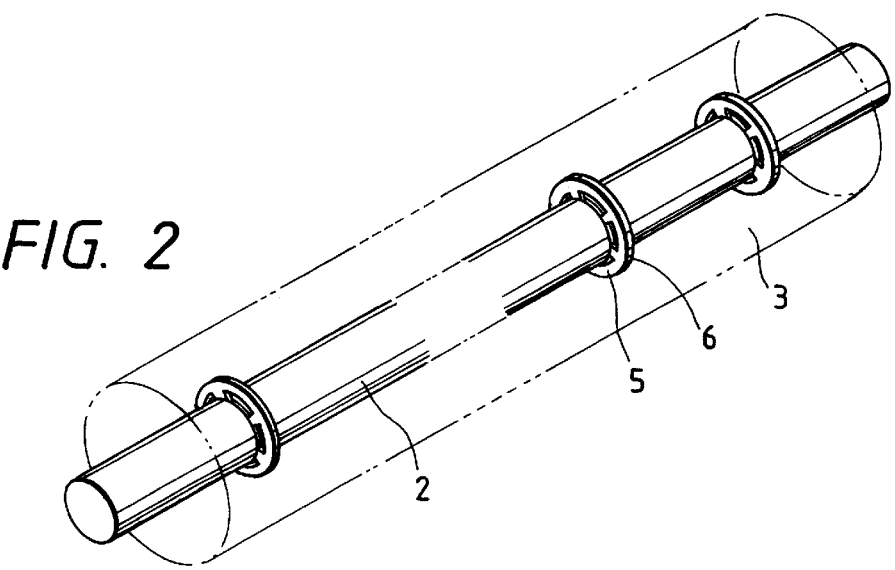
FIG. 2 is a perspective view showing another embodiment of a roller shaft.

FIG. 2 shows another means for integrating the roller shaft 2 with the core body 3. This embodiment includes arranging grooves 5 at a plurality of positions along the length of the roller shaft 2 and firmly coupling the roller shaft 2 to the core body 3 through E-rings 6 fitted into the grooves 5. Various modifications can be made on this integrating means. For example, grooves may be formed in the axial direction in the circumferential surface of the roller shaft 2.

Figure 3:
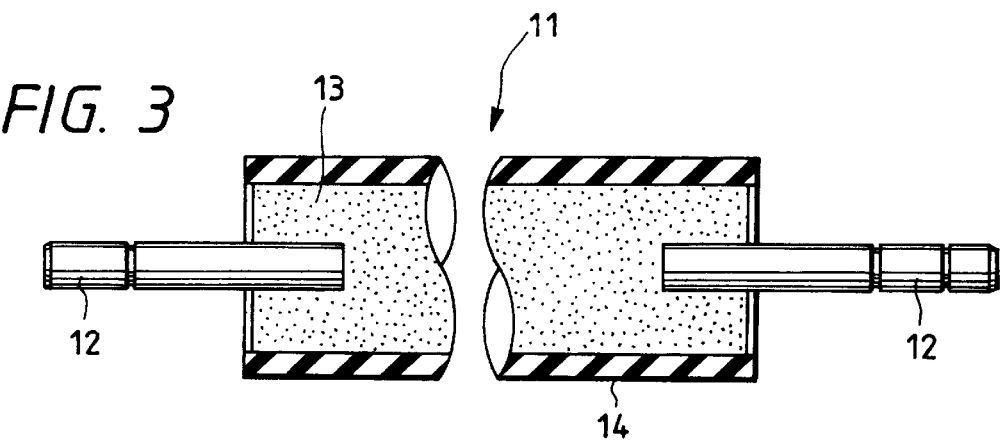
FIG. 3 is a sectional view showing a platen roller according to a second embodiment of the invention.

On the other hand, FIG. 3 shows a platen roller, which is another embodiment of the invention.

This platen roller 11 has projecting short roller shafts 12 outward from both ends of a core body 13 made of ceramic. The roller shafts 12 are aligned with the shaft center of the core body 13. In FIG. 3, reference numeral 14 denotes a surface layer made of hard rubber. The surface layer 14 is arranged around the circumfernetial surface of the core body 13 at a uniform thickness.

Each roller shaft 12 used in this embodiment is, as shown in FIG. 9, designed so that a circumferentially extending recessed groove 15 and a plurality of axially extending linear grooves 16 are formed in an end thereof embedded into the core body 13. As a result of this arrangement, slippage of the roller shafts 12 with respect to the core body 13 in both the circumferential direction and in the axial direction can be prevented. The roller shafts 12 are integrated with the core body 13 through the ceramic charged into these grooves.

Figure 4:
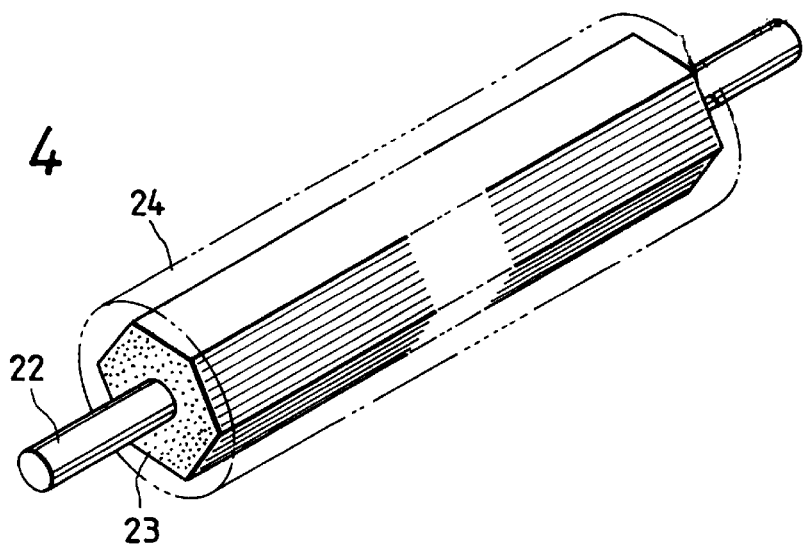
FIG. 4 is a perspective view showing a platen roller according to a third embodiment of the invention.

On the other hand, the exemplary platen roller 24, shown in FIG. 4, is integrally formed such that a core body 23 is disposed about roller shaft 22. A covering, preferably consisting of hard rubber, forms a surface layer 24 around the circumferential surface of core body 23 in order to prevent slippage and idle rotation between the core body 23 and the surface layer 24. The section of the core body is polygonal.

Figure 5:
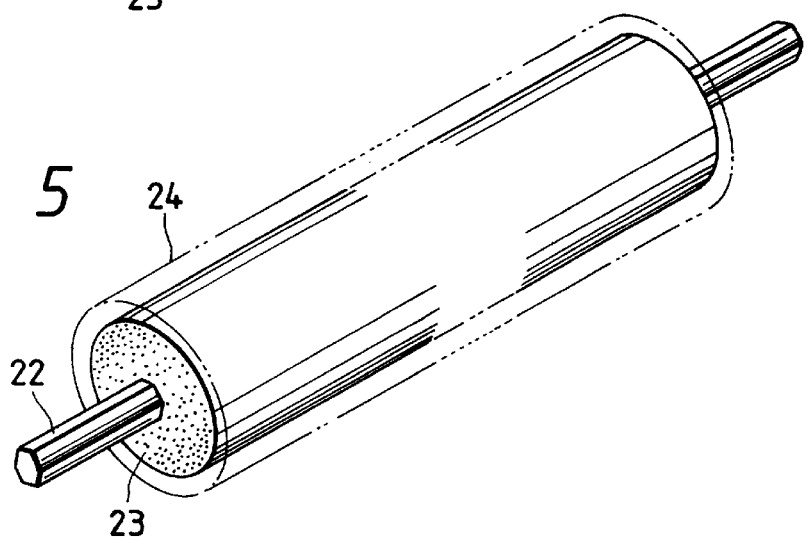
FIG. 5 is a perspective view showing a platen roller according to a fourth embodiment of the invention.

Further, an embodiment shown in FIG. 5 is characterized as making the section of the roller shaft 22 polygonal in order to prevent slippage between the roller shaft 22 and the core body 23. The section of the roller shaft 22 may also be oval or D-shaped.

Figure 6:
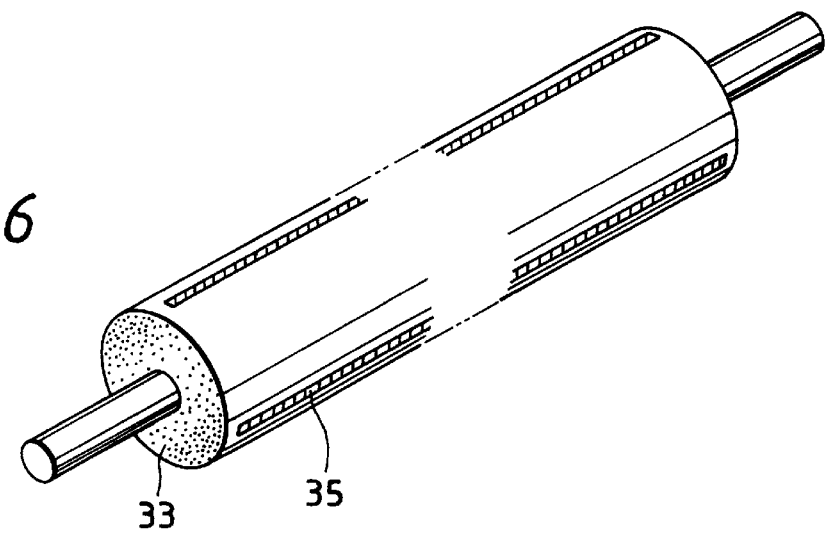
FIG. 6 is a perspective view showing a platen roller according to a fifth embodiment of the invention.
Figure 7:
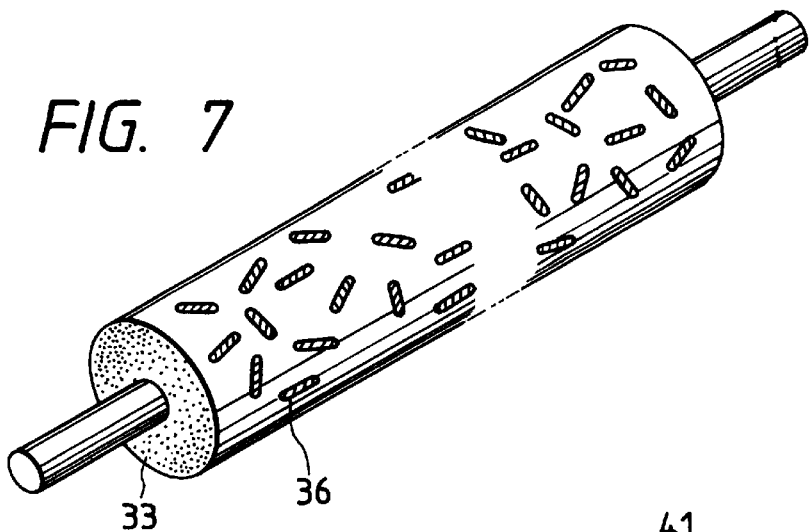
FIG. 7 is a perspective view showing a platen roller according to a sixth embodiment of the invention.

Still further, an embodiment shown in FIG. 6 includes a plurality of reinforcing members 35 embedded into the circumferential surface of a cylindrical core body 33 made of ceramic. Reinforcing members are provided in the axial direction. The reinforcing members 36 of the embodiment shown in FIG. 7 is made of fibrous pieces randomly in order to improve bending strength.

FIG. 8 shows a mold for forming the platen rollers of the invention so as not to produce eccentric rollers.

In FIG. 8, reference numeral 40 denotes a mold for forming the core body 3 in such a manner that the roller shaft 2 can be positioned in the center correctly without being eccentric. This mold 40 has the same inner diameter as the outer diameter of the core body 3, and includes a pair of half-split bodies 41 that are prepared by splitting the mold at a plane including the shaft center. Each half-split body 41, 41 includes split edges 43, 47 and end walls 42, 45, which are positioned to enclose the longitudinal ends of core body 3 and surface layer 4. End wall 42 includes a recess 44 in the middle of split edge 43 of end wall 42 along split edge 43. The section of the recess 44 is semicircular, and is sized to permit roller shaft 2 to pass therethrough. Further, the other end wall 45 of each half-split body has a ceramic injecting hole 47 whose diameter is far greater than the diameter of the shaft. The ceramic injecting hole 47, which is formed in the middle of a split edge 46 of the hole 47 along such split edge, is also designed to be sealed by a stopper body 49 after the ceramic has been injected. The stopper body 49 has a through hole 48 in the middle thereof and has the same outer shape as the ceramic charging hole 47. The stopper body 49 serves also as an aligning member.

Therefore, when the half-split bodies 41 are coupled together so as to clamp the roller shaft 2 from above and below, ceramic is injected into the space formed by the coupled half-split bodies 41 through the ceramic injecting hole formed of the end walls, and the hole is sealed by the stopper body 49 serving also as an aligning member, the pair of half-split bodies 41 have one end thereof aligned through the recesses 44 and the other end aligned through the stopper body 49 serving also as an aligning member. As a result, the core body 3 is solidified around the circumferential surface of the roller shaft 2 without being made eccentric. Hence, when the surface layer 4 is formed around the circumferential surface of the thus formed core body 3 as a final stage either by hardening the rubber or forcing the rubber into a uniform thickness, impact from the wires can be absorbed by the surface layer 4 made of rubber in the thus formed platen roller 1. Further, the excellent effect of damping brought about by the ceramic that forms the core body can significantly reduce noise during data recording. Still further, the pipe made of metal is dispensed with, which contributes to downsizing the roller shaft and reducing the structural cost of the roller shaft.

FIG. 9 shows a platen roller forming mold of another embodiment.

This mold 50 is designed to form the core body 13 having the short shafts 12 fixed to both ends of the core body 13 as shown in FIG. 3. The mold 50 includes a pair of upper and lower half-split bodies 51, 51 whose inner diameter is the same as the outer diameter of the core body 13. Recesses 54, 56 allowing the roller shaft 12 to pass therethrough are arranged in the middle of the split edges of the half-split bodies 51. One end wall 55 of each half-split body has a plurality of ceramic charging holes 57 around the outer circumference of the corresponding recess 56. The ceramic injecting hole 57 is designed to be sealed by a sealing body 52. The sealing body 52 has a through hole 58 in the middle thereof so that the roller shaft 12 can pass through such through hole 58. In addition, the sealing body 52 has stoppers 59 projected around the circumference of the through hole to seal the ceramic injecting holes 57.

FIG. 10 shows another exemplary platen roller forming mold. This mold 60 includes a pipe-like mold 61 whose diameter is the same as the diameter of a core body to be molded, and sealing bodies 62 with a shaft hole 63 which seal both ends of the mold 61.

While the foregoing describes the invention by taking the platen roller of a wire dot printer as an example, the invention is not limited to such platen roller, but may, of course, be applied to sheet feed rollers and the like of copying machines.

As described in the foregoing, the invention provides a core body of a roller by solidifying a fluid material such as cement or ceramic and arranging a surface layer made of hard rubber on the surface of the thus formed core body. Therefore, when the intention is applied to the platen roller of a wire dot printer in particular, noise made by the wires impinging on the platen roller is absorbed efficiently by the surface layer made of rubber, and vibrations derived from the noise can be damped greatly by the effect of damping of the highly dense and less resilient material of which the core body is made. Thus, this construction contributes to a significant noise reduction during data writing. In addition, when the invention is applied to ordinary sheet feed rollers and the drum of a copying machine, the cylindrical pipe made of metal can be dispensed with, which in turn contributes to a significant manufacturing cost reduction of these types of rollers.

The invention is further characterized as forming the core body of the platen roller using a mold constructed not only of a pair of half-split bodies and a stopper body serving also as an aligning member. One end wall of each half-split body has a recess for clamping the roller shaft and the other end wall of the half-split body has a hole for charging a core body forming fluid such as paste. The stopper body has a through hole in the middle thereof so that the roller shaft can be inserted into the through hole, and projects a stopper on the outer circumference thereof so that the stopper can be fitted into the injecting hole. Therefore, the recesses for clamping the roller shaft and the stopper body serving also as an aligning member allow the roller of this type to be molded correctly without being eccentric.

Still further, when the mold is made cylindrical, the operation of injecting and sintering the material can be made easy, which in turn contributes to a reduction in the cost of core body molding.

We claim:

1. A roller for an image forming apparatus comprising:

a core body having a shaft positioned in the center thereof, said core body being formed of one of cement material and ceramic material solidified about a portion of said shaft; and a surface layer formed on a surface of said core body, said surface layer comprised of rubber and having a uniform thickness.

2. The roller for an image forming apparatus according to claim 1, wherein a hole is formed in the circumferential surface of said shaft to secure said core body to the shaft when said core body solidifies.

3. The roller for an image forming apparatus according to claim 1, further comprising:

a groove formed in a circumferential surface of said shaft; and a ringlike member fitted with said groove for coupling said core body to said shaft when said core body solidifies.

4. A roller for an image forming apparatus comprising:

a first shaft and a second shaft positioned coaxially with said first shaft;

a core body formed on and disposed about a portion of said first shaft and said second shaft, said core body being formed of one of cement material and ceramic material solidified about a portion of said first shaft and said second shaft; and a surface layer formed on a surface of said core body, said surface layer comprised of rubber and having a uniform thickness.

5. A roller for an image forming apparatus according to claim 1, wherein said shaft has a polygonal cross-section.

6. A roller for an image forming apparatus according to claim 1, wherein said core body has a polygonal cross-section.

7. A roller for an image forming apparatus according to claim 1, wherein a plurality of reinforcing members are embedded in said core body in an axial direction of said core body.

8. A roller for an image forming apparatus according to claim 1, wherein multiple reinforcing pieces are embedded in said core body.

9. A roller for an image forming apparatus according to claim 1, wherein said surface layer is in direct contact with said core body.

* * * * *